June 21, 1932.  O. M. TUCKER ET AL  1,864,277
SHEAR STRUCTURE FOR GLASS MACHINERY
Filed June 28, 1920   8 Sheets-Sheet 2
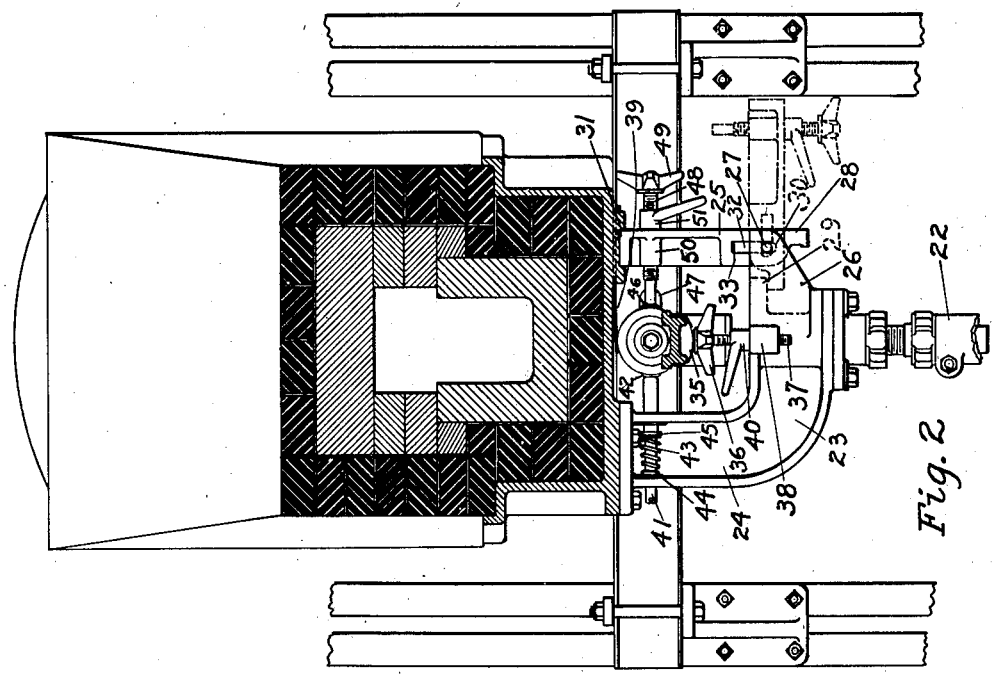
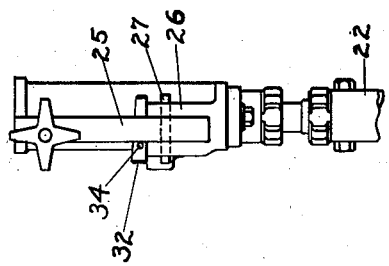
Oliver M. Tucker
William A. Reeves   Inventor
By Edwin P. Corbett   Attorney

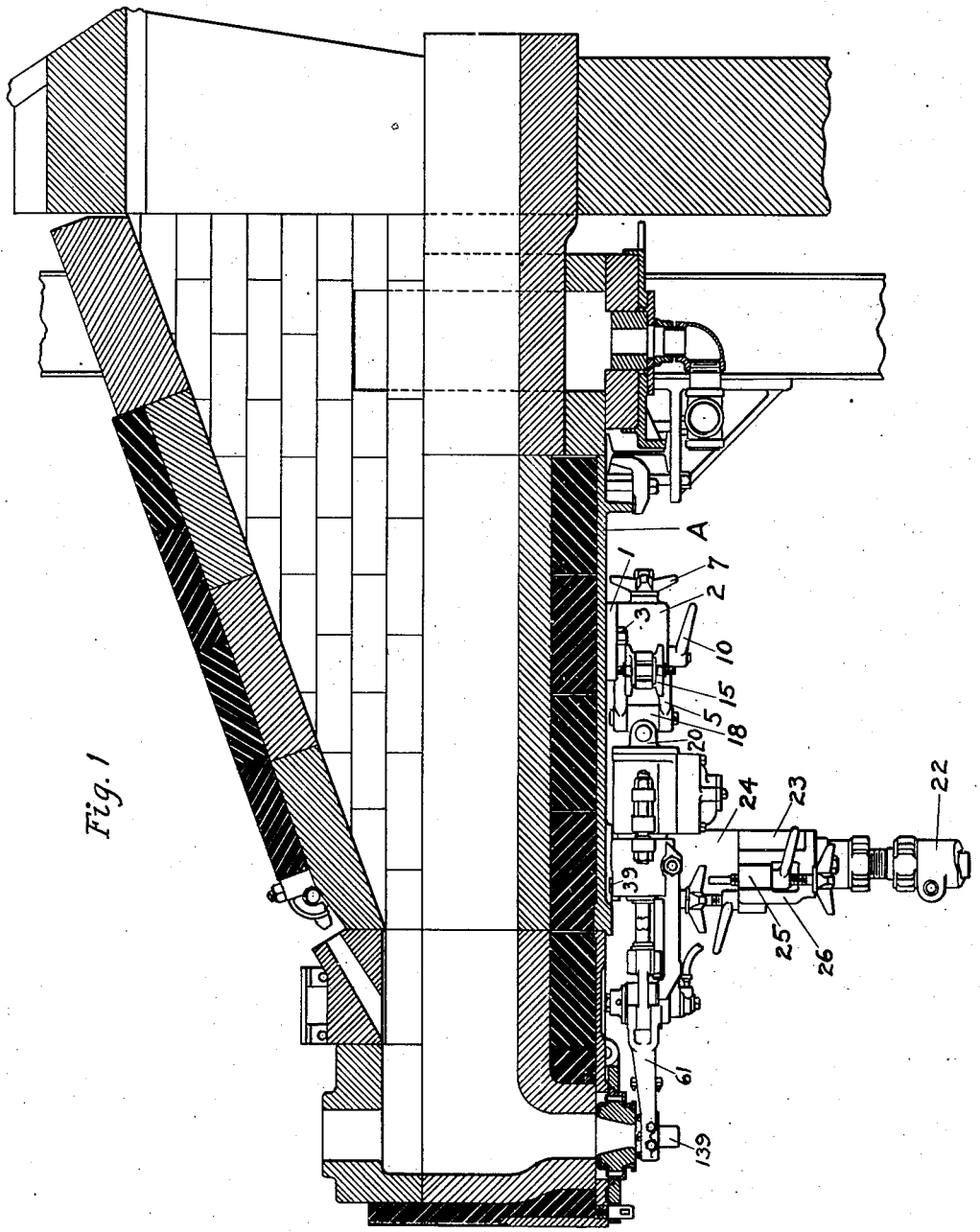

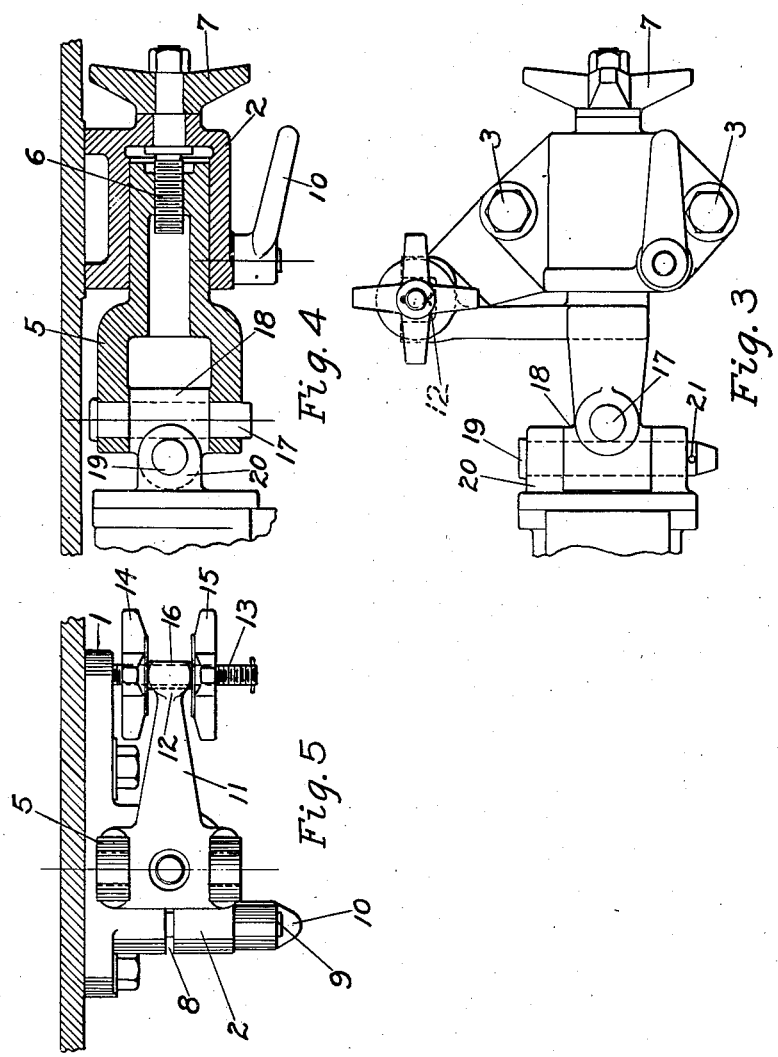

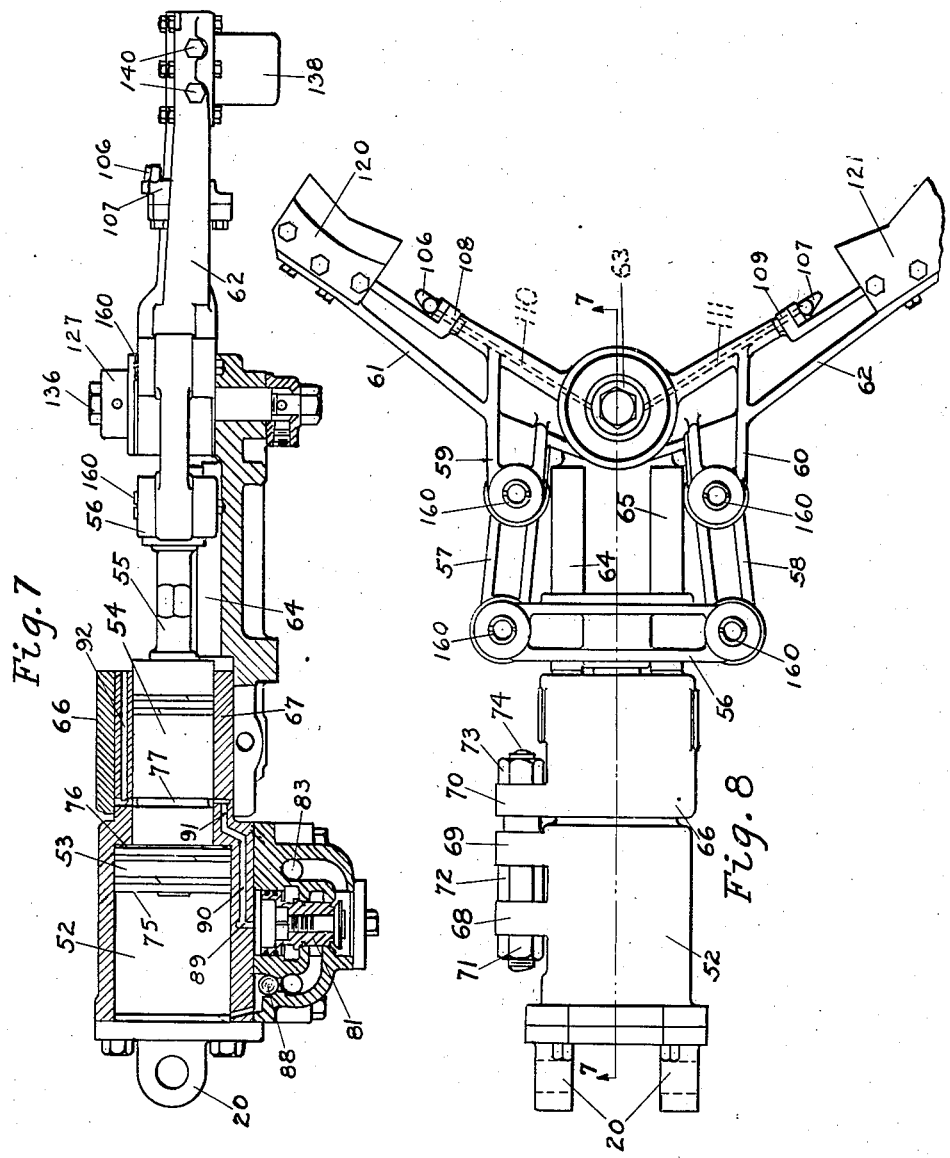

June 21, 1932.  O. M. TUCKER ET AL  1,864,277
SHEAR STRUCTURE FOR GLASS MACHINERY
Filed June 28, 1920  8 Sheets-Sheet 5
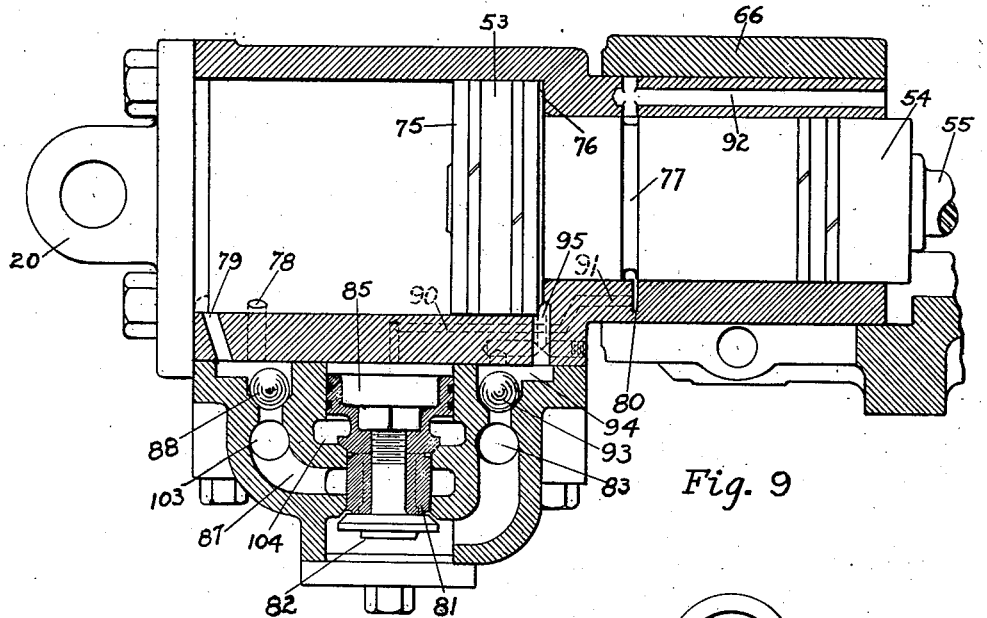
Fig. 9
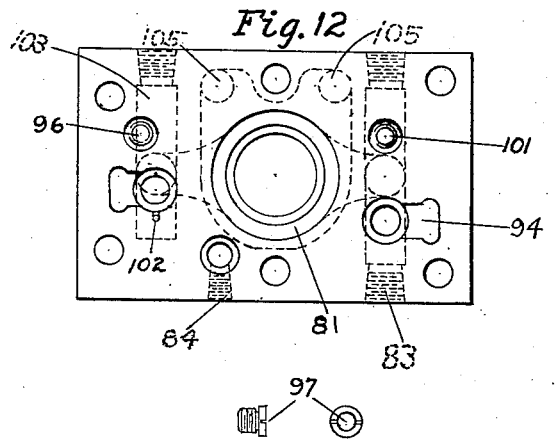
Fig. 12
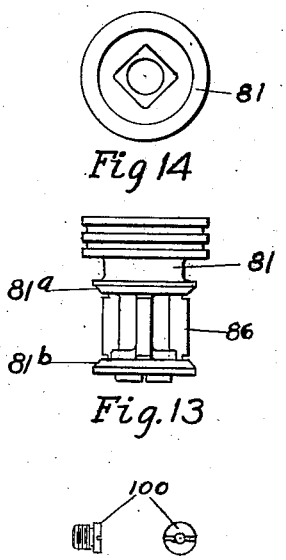
Fig. 14
Fig. 13
Fig. 15
Fig. 16
Oliver M. Tucker
William A. Reeves
Inventor.
Edwin P. Corbett
Attorney.

June 21, 1932.   O. M. TUCKER ET AL   1,864,277
SHEAR STRUCTURE FOR GLASS MACHINERY
Filed June 28, 1920   8 Sheets-Sheet 6
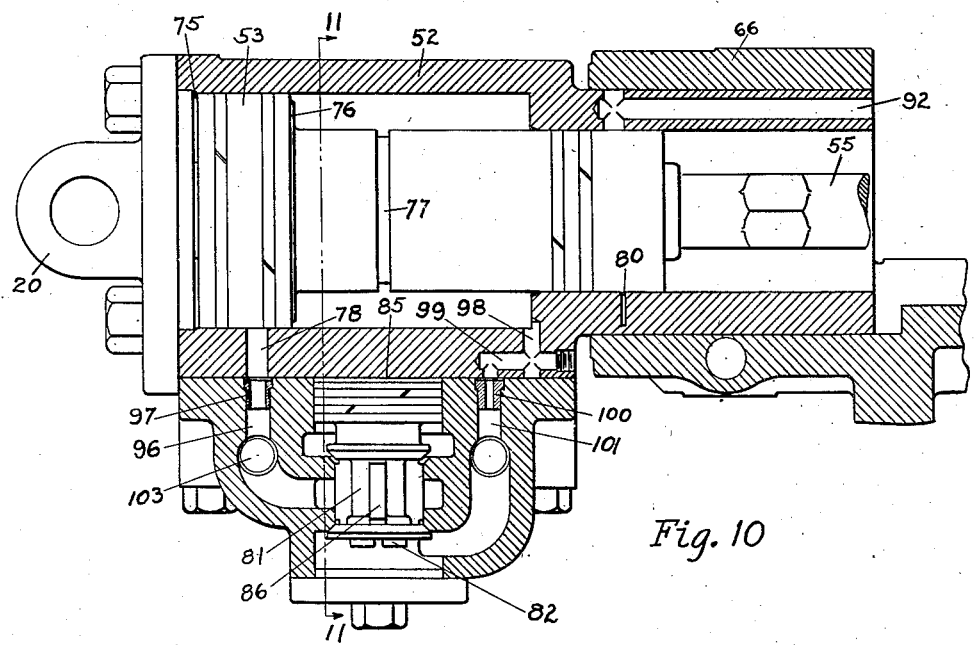
Fig. 10
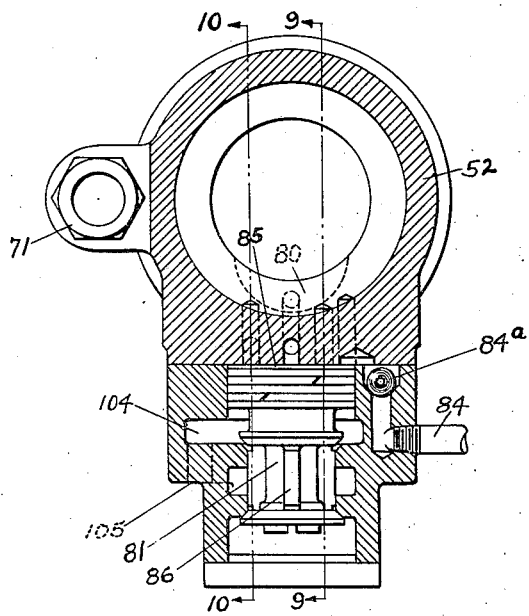
Fig. 11  Oliver M. Tucker  Inventor
William A. Reeves
By Edwin P. Corbett
Attorney

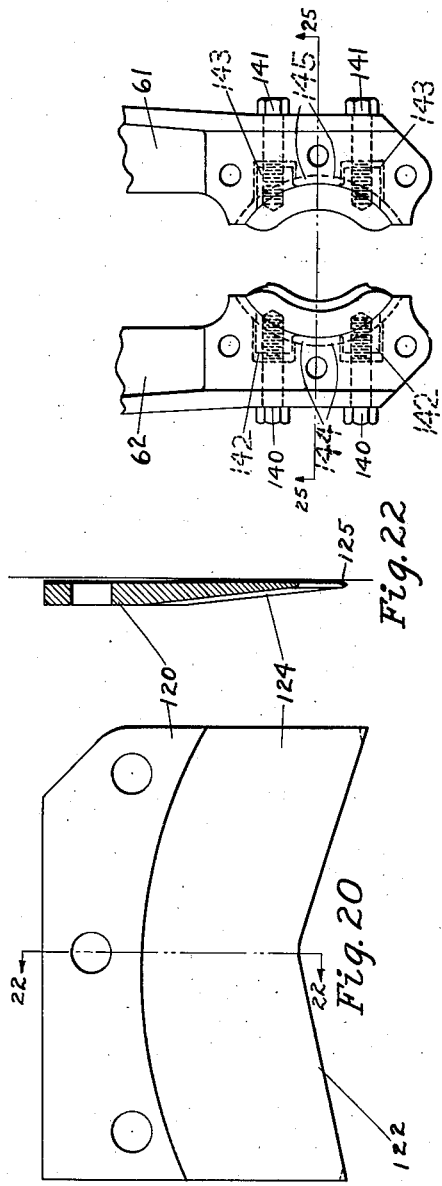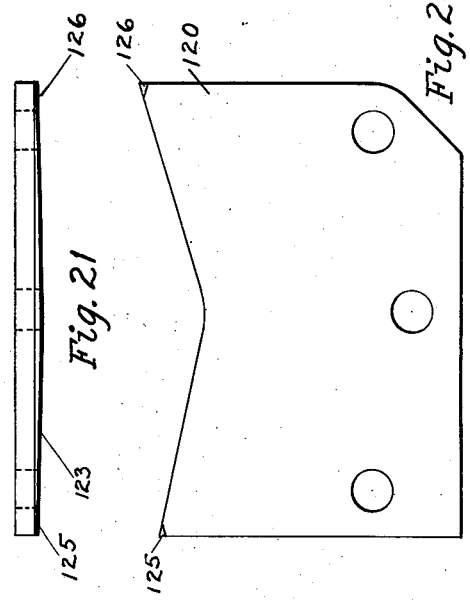

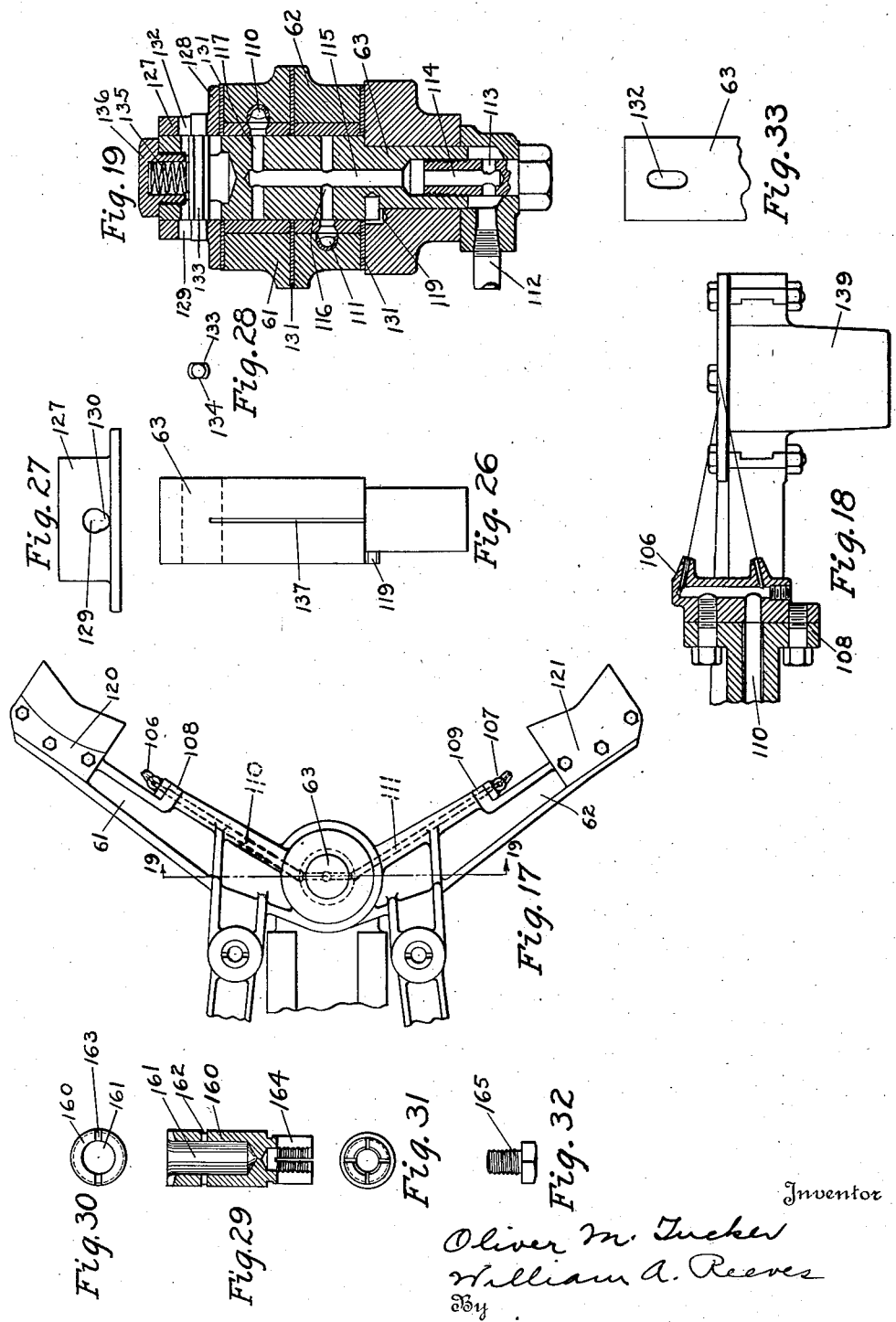

Patented June 21, 1932

1,864,277

UNITED STATES PATENT OFFICE

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE

SHEAR STRUCTURE FOR GLASS MACHINERY

Application filed June 28, 1920. Serial No. 392,231.

Our invention relates to a novel form of shear structure for glass machinery and aims to provide a compact and unitary structure which may be readily applied or removed and which is adjustable in practically every direction and to meet practically every condition, with no adjustment interfering with any other adjustment.

Certain features of the invention disclosed by this application are also disclosed by our prior copending application, Serial No. 120,429, filed Sept. 16, 1916, method and apparatus for separating quantities of molten glass from mass, of which the present application, therefore, is a continuation in part.

An important feature of our apparatus resides in the fact that it may be adjusted so as to provide for raising or lowering the shears, for adjusting them longitudinally or laterally and for tilting them either in a lateral direction or longitudinally if it should be desired.

We have further provided a structure of shear mounting which permits of adjustment of the shears to vary the degree of overlapping of the shear blades without varying the throw of the structure which causes the movement of such shears into and out of overlapping relation.

We have further provided a series of guides for lump charges which are to be applied in pairs, one to each shear arm. These guides which are attached to the shear arm are especially prepared with reference to the size of the bushing and with reference to the tilt of the shears and they serve the purpose of insuring the positioning of the lump charges so that they will drop with substantial perpendicularity into the molds.

We have also provided in connection with our shear structure and the operative mechanism therefor, a means for operating the shears at a high rate of speed. This we accomplish by the provision of mechanism which enables us to bring the shears together at one speed and then move them apart at another speed, the speed of moving apart being preferably greater than the speed of bringing them together. The structure is such that the shear blades may be brought together at ample speed and with ample power to ensure an efficient cutting action and may be separated with a greater speed. The result of this is that the blades effect a clear and clean cutting action and are in contact with the glass for a minimum period of time with the result that no damage is done to the shear blades and that there is no chill mark placed upon the freshly cut end of the glass column except such a one as will be removed by the heat of the glass.

In addition, we have provided a differential piston construction in the operating mechanism for the shears and we have provided a valve constructed along similar lines whereby the action of closing and opening of the shear arms may be continued indefinitely when operated by the intermittent application of air pressure thereto.

There are many other features of advantage in our invention which will appear as this description progresses. The preferred embodiment of our invention is shown in the accompanying drawings wherein similar characters of reference designate corresponding parts and wherein Figure 1 is a side elevation of our shear structure shown applied to a glass delivery spout.

Figure 2 is a transverse section of the structure shown in Figure 1, taken in front of the front supporting post and looking toward the furnace.

Figure 3 is a detail in bottom plan of the rear end of the shear structure.

Figure 4 is a sectional view of the structure shown in Figure 3.

Figure 5 is a front elevation of the structure shown in Figures 3 and 4 with the shear cylinder and connecting parts removed.

Figure 6 is a detail view taken at right angles to the post and yoke structure illustrated in Figure 2.

Figure 7 is a partial vertical longitudinal section taken on line 7—7 of Figure 8 of the shear operating mechanism detached from the apparatus which supports it at its rear end and showing the shears closed. In this figure, the piston which operates the shear structure is shown at the forward end of its stroke and just before the controlling valve therefor has moved into the position it assumes during the movement of the piston in the opposite direction.

Fig. 8 is a top plan view of the structure shown in Figure 7 with the shear blades open.

Figure 9 is a longitudinal section taken approximately on line 9—9 of Figure 11 of the shear operating cylinder and piston and the valve structure. In this figure, the piston which operates the shear structure is shown at the forward end of its stroke and just before the controlling valve therefor has moved into the position it assumes during the movement of the piston in the opposite direction.

Figure 10 is a similar longitudinal section taken approximately on line 10—10 of Figure 11 of the structure shown in Figure 9 but taken along a different line and showing the position of the piston and valve structure when the shears are opened.

Figure 11 is a transverse section taken on line 11—11 of Figure 10 and illustrating the way in which the air delivered through pipe 84 passes through the check valve 84ª to the space above the piston of the valve 81.

Figure 12 is a plan view of the valve containing structure removed.

Figure 13 is a side elevation of the valve removed.

Figure 14 is a plan view of this valve.

Figure 15 is a detail view of the choking device for limiting the exhaust of air from in front of the larger piston area.

Figure 16 is a similar detail view of the choking device for limiting the exhaust of air from in front of the smaller piston area.

Figure 17 is a detail in plan illustrating the shear post structure and the shear lubricating mechanism.

Figure 18 is a sectional view of this shear lubricating mechanism.

Figure 19 is a vertical section of the shear post structure taken on line 19—19 of Figure 17 and the elements carried thereby.

Figure 20 is a plan view of one of the shear blades detached.

Figure 21 is a front elevation illustrating the curvature of the cutting edge of the shear blades.

Figure 22 is a transverse section of one of the shear blades also illustrating the curvature of its cutting edge.

Figure 23 is a bottom plan view of the shear blades shown in Figures 20 and 21.

Figure 24 is a plan view of the front end of the shear arms with the blades removed.

Figure 25 is a transverse section taken on line 25—25 of Figure 24 of the structure shown in Figure 24 with the detachable blades shown in dotted lines.

Figure 26 is a side elevation of the shear post removed.

Figure 27 is a side elevation of the collar which embraces the shear post and rests upon the shear arms.

Figure 28 is an end elevation of the trunnioned pin by which the collar is forced downward to hold the shear arms together.

Figure 29 is a vertical section of one of the vertical posts for connecting the shear arms to their operating links.

Figure 30 is a top plan view of the post shown in Figure 29.

Figure 31 is a bottom plan view of the post shown in Figure 29.

Figure 32 is a detail view of the expanding bolt which is adapted to be inserted into the bottom of the post shown in Figure 29.

Figure 33 is a detail view of the upper end of the shear post illustrating the slot through which passes the trunnioned pin shown in Figure 28.

In the drawings, our entire shear structure is shown mounted upon our preferred form of spout in Figure 1. The description of this entire structure will be divided into several successive parts which may be termed, respectively, the positioning mechanism, the shear actuating mechanism, the shear lubricating device, the shear blades and the guide members.

The positioning mechanism is shown best in Figures 1, 2, 3, 4 and 5, wherein it will appear that our shear structure, which is mounted upon the bottom of the spout frame A, comprises a base plate 1 upon which is integrally mounted a split housing 2. This base plate is secured to the spout frame by means of bolts 3. This split housing is designed to adjustably receive the shank of a clevis 5, which shank is cylindrical in form and is provided at its rear end with a threaded bore for the reception of an adjusting screw 6 carrying at its rear end a star hand wheel 7. The split in the housing 2 may be designated 8 and the tightening or loosening of this split sleeve upon the shank of the clevis 5 is under the control of a screw bolt 9 having a handle 10. When it is desired to move the clevis shank and therefore the shears forwardly or rearwardly, it is necessary to operate the handle 10 to loosen the split housing, whereupon this clevis shank and the shear structure may be adjusted either forwardly or rearwardly by rotation of the star hand wheel 7.

The clevis 5 is also capable of a rotary adjustment for the purpose of tilting the shears bodily and their guides to any desired angle. This rotatable adjustment is first rendered possible by loosening the split sleeve through the medium of the handle member 10 and then it is accomplished by means of a supplemental clevis arm 11 having a bifurcate portion 12. This bifurcate portion embraces a downwardly depending bolt 13 carried by the base plate 1 and threaded throughout its length. Mounted upon the bolt 13 are two star wheels 14 and 15 and an interposed spanner sleeve 16, which spanner sleeve is slightly greater in length than the depth of the legs of the bifurcate member. This spanner sleeve serves to limit the movement of the star hand wheels 14 and 15 toward each other with the result that regardless of the position of adjustment of such wheels, the bifurcate member will never be so bound as to preclude longitudinal adjustment of the shank of the main clevis member 5. The surfaces of the legs of the supplemental clevis member are desirably rounded at the point at which they contact with the opposing star hand wheels so as to provide a ready clearance as the supplemental clevis arm 11 is adjusted to tilt the shear members or to return them to perfectly level position.

The clevis 5 is provided near its outer extremity with a vertical pivot pin 17 upon which is mounted a universal knuckle 18 having a pivot shaft 19 at right angles to the pivot 17. The shear actuating means is provided up on its rear end with spaced perforate lugs 20 between which fit one sleeve of the universal knuckle 18 so that the pivot pin 19 may pass through the registering openings in such lugs and in said sleeve with the result that the actuating means is given a universal support at its rear end and upon the clevis 5. This actuating means is thus rendered capable of any desired movement and in practice the pin 19 will normally be held in place by the weight of the said actuating means thereon. In Figure 3 we have shown a cotter pin 21 for retaining the pin 19 in position but under normal conditions this is unnecessary. The structure shown in Figures 3, 4 and 5 with the exception of the actuating means and the perforate lugs 20 thereon is permanently mounted upon the spout framework while the actuating means may be readily removed by merely knocking out the pin 19.

The forward end of the spout structure is supported by a post 22 which carries at its upper end a yoke 23 (see Figure 2) which yoke is provided with one permanent side as at 24 and with a side member 25 which is capable of being held in permanent vertical position but which is also capable of being swung downwardly and outwardly to permit of removal of the shears and their actuating mechanism which are disposed between the upright sides or legs of the said yoke. The adjustable side or leg 25 of this yoke is pivoted at its lower end in between a bifurcate structure 26 of the yoke by means of a pivot pin 27 and it is also provided at its lower end with a stop extension member 28 designed to abut against the shoulder 29 to limit the downward movement of this member 25 while the pin 27 limits its outward movement.

The member 25 is mounted upon the pivot pin 27 by means of a slot 30 so that the member 25 when in upright position will be capable of a vertical sliding movement upon this pin. The purpose of this is illustrated clearly in Figure 2 wherein the upper end of the member 25 is shown fitting into a recess 31 in the bottom of the spout frame. In attaining this position, the member 25 is first swung from dotted line to full line position and then the wedge member 32 is forced into the slot 33 and by exerting pressure between the upper edge of the yoke and the top of the slot 33 causes the member 25 to move upwardly into the recess 31 and to remain in this position with the result that this member 25 becomes for the time being a permanent side or leg of the yoke. The extent to which the wedge 32 may be forced inwardly is limited by the cross pin 34.

Adjacent the forward end of the shear actuating means and on the under side thereof we have provided a rounded bearing surface 35 which is a portion of a true circle which is concentric with the central line of the shear mechanism which is also coincident with the center line of the shear blades. This bearing surface is designed to rest upon the top of a star hand wheel 36 which is in turn mounted upon the top of a screw member 37 threaded into a sleeve 38 forming an integral part of the yoke member. Thus, the rotation of the star hand wheel 36 will serve to either raise or lower the forward end of the shear structure which swings about the pin 19 previously described. The forward end of this shear structure is normally forced downwardly by a leaf spring 39 and when once adjusted vertically by rotation of the star hand wheel 36, this adjustment may be maintained by means of the handle lock nut 40. It will be seen that the provision of the specially rounded bearing surface 35 ensures that the height from the center of the shears to the bottom of the bushing will always be the same regardless of the extent to which these shears have been partially rotated by means of the adjustments previously described.

A means is also provided and mounted upon the yoke structure for the purpose of providing a ready lateral adjustment of the forward end of the shear mechanism. This means is such that the proper adjustment may be attained regardless of the degree of rotation of the shear actuating mechanism. It takes the form of a pin 41 passing through the side 24 of the yoke and bearing at its inner end upon a rounded surface 42. This pin is normally pressed against this rounded surface 42 by means of the coil spring 43 resting at one end against the flange of the yoke member 24 as at 44 and bearing at the other end upon a shoulder 45 carried upon this pin. Bearing upon the opposite side of the shear actuating mechanism and more particularly upon the rounded surface 45 thereof is a pin 47 threaded as at 48 and having a star hand wheel 49 thereon. The said pin 47 may be adjusted in the internally threaded sleeve 50 upon the member 25 and it may be locked in any position of adjustment by means of the handle lock nut 51. Thus, the shear actuating mechanism and the part carried thereby are held against sidewise movement by the coactive effect of the pins 41 and 47 and side adjustment may be effected merely by rotation of the star-hand wheel 49 after release of the handle lock nut 51. Furthermore, the rounded surfaces 42 and 46 being likewise concentric with the rounded surface 35 and the longitudinal center line of the shear structure and blades permit of ready and proper adjustment regardless of the degree of rotation of the shear structure and blades by the mechanism previously described. Likewise, the surfaces 35, 42 and 46 ensure against any distorted adjusting action due to any likely adjustments which may have been made longitudinally of the shear structure.

The shear actuating mechanism is shown best in Figures 7, 8, 9, 10, 11, 12, 13, 14, 15 and 16. It comprises a cylinder 52 constructed to accommodate a piston of differential area construction which operates by means of a cross-head and connecting mechanism to close and open the shears. Operating within the cylinder 52 is a piston having a head 53 and a decreased portion 54. To the front end of this decreased portion 54 there is a piston rod 55 connected to a cross-head 56 which in turn is connected at its ends to links 57 and 58. These links 57 and 58 are in turn pivotally connected to lateral extensions 59 and 60 upon the shear arms 61 and 62. The shear arms 61 and 62 are pivotally mounted as at 63 upon the member which carries cross-head guides 64 and 65, which guides are integral extensions of a cylindrical sleeve 66.

This cylindrical sleeve 66 is a split sleeve and is longitudinally adjustable upon a decreased portion 67 of the cylinder 52. This adjustment is effected by means of the pierced lugs 68 and 69 upon the cylinder 52, the pierced lug 70 upon the sleeve 66 and the nuts 71, 72 and 73 upon the stud 74. The nut 71 serves as a lock nut. The result is that any rotation of the nut 72 must bring about a longitudinal movement of the sleeve 66 and yet all of the parts are held in perfect alignment and locked there by the lock nut 71.

An important feature of this invention arises from the fact that in the structure just described, the pivot about which the shears swing may be moved either forward or backward with relation to the mechanism which causes the operation of the shears. The immediate result of this is the degree to which the shears overlap in operation may be predetermined at will. Thus, the overlap may be maintained constant regardless of the width of the blades being used or it may be varied regardless of such width. The ability to effect this adjustment is particularly advantageous in that it provides a means for compensating for the wear of the shear blades and also provides a means for properly positioning the guides which extend downwardly from the shear arm and in the cutting operation momentarily surround the charge and ensure a centering action thereon so that each charge will drop properly into the mold.

Returning to the cylinder and piston construction through which power is applied to close and open the shear, it will be noted that the piston head 53 is subject to pressure from both sides and has a greater area on side 75 than it has on side 76. It will also be noted that the reduced extension 54 of the piston is provided with an annular channel 77.

The cylinder 52 is provided at its rear extremity with two outlet ports 78 and 79. It is also provided in the area within which works the reduced extension 54 of the piston with an arcuate groove 80 extending for a substantial distance around the inner periphery of the cylinder. The purpose of the outlets 78 and 79 and the groove 80 will be more fully disclosed as this description progresses.

The differential piston is under the control of a constantly applied pressure having effect upon the surface 76 of the piston head and an intermittently applied pressure having effect upon the surface 75 of the piston head.

Normally, the piston head 53 is at the end of the cylinder as shown in Figure 10. It is held in this position by the constant pressure air having effect upon surface 76 and by the fact that there is no pressure being applied to the surface 75. The valve 81, shown best in Figures 9, 10, 13 and 14, is similar in construction to the differential piston and is normally held raised by air pressure applied constantly to the lower end of the valve as at 82. The valve 81 is provided with valve shoulders 81$^a$ and 81$^b$. 81$^a$ controls the exhaust of air from the space in front of the surface 75 of the piston while 81$^b$ controls the inlet of air to the space in front of such surface. It will be understood that this air pressure is being constantly supplied from a main air reservoir to this chamber through the port 83. There is a port 84 for the momentary admission of air under pressure to the space 85 above the piston of the valve 81. (See Figures 11 and 12.)

The control for this introduction of air under pressure to this space 85 preferably takes the form of an automatically driven timer with the result that at chosen intervals, air under pressure is admitted through the port 84 and through a ball check 84$^a$ to the space 85. Whenever pressure air is thus admitted to the space 85, the valve 81 is forced downwardly and constant pressure air passes upwardly around the lower end of the valve 81, between the guides 86 thereof and into the passage 87, thence up through the ball check valve 88, through the passage 79 to a point behind the piston head 53 where it has effect upon the surface 75 of such piston head. The piston then starts to move forwardly and with it move the piston rod, the cross-head, and the links operated thereby to bring the shear arms and the shear blades into shearing relation.

At the end of this stroke which constitutes the end of the shearing action, the channel 77 in the reduced portion of the piston comes into register with the arcuate groove 80. When this occurs, the pressure air above the piston 81 is permitted to escape through the passage 89, passage 90 and passage 91, arcuate port 80, annular channel 77 and passage 92 extending along the cylinder wall to the atmosphere, whereupon the constant pressure air will lift the valve 81.

It is also important to note that our shear structure may be adjusted to any of the positions indicated above while the machine is in operation and the shears are performing their cutting action. This is a very important feature in the maintenance of production of glassware. It is highly desirable, as will be appreciated, to make any adjustments that have to be made without stopping any portion of the feeding device.

The movement of the piston 53 to either end of its chamber is cushioned by a specially provided means for decreasing the exhaust of air from in front of the surface opposite to that surface to which air under pressure is at the moment being applied. Thus, when the piston 53 starts to move to the left in Figure 9 under the impulse of air applied to the surface 76, the air in the cylinder 52 and in advance of the surface 75 is first forced through the passages 78 and 79. Reference to Figure 10 will show that the passage 78 communicates with a passage 96 but that at the point of communication therewith passage 96 is fitted with a bushing 97 for restricting the outlet area through which the air being exhausted may pass. A similar condition applies on the movement of the piston 53 from its furthermost left-hand position in Figure 10 into the position in which it appears in Figure 9. The air in front of the surface 76 is forced through passage 98, passage 99 and bushing 100 of passage 101. The effect of this bushing is to produce a choking of the air which is being forced back into the supply line to a material extent in a manner similar to the choking action of bushing 97. These bushings which are shown best in Figures 15 and 16 may be removed and replaced by bushings of different size and they afford a semi-permanent controlling means, that is, a controlling means which is not accessible to the average operator of the machine. They place a control on the speed of movement of the piston 53 in either direction and consequently on the speed of opening and closing of the knives. By bushings of this sort, the knives may be caused to close slowly and open rapidly as they would do with the bushings shown in the drawings; or they may be caused to close rapidly and open slowly. However, the preferred operation is provided for in the structure shown in the drawings where the bushings are of such size that the closing is somewhat slower than the opening. This avoids a hammering action of the shears at the end of the cutting stroke and ensures a quick withdrawal. Under these conditions, the shears are in contact with the glass for a minimum period of time. By this construction, it is possible to so operate the shears that the instant of closure and opening of the shears cannot be detected with the eye. It will be understood from Figure 9, however, that upon closing of the shear the ball check 93 prevents the escape of air from the cylinder by the passage 95, thus forcing all of the air out through the passages 98 and 99 and the bushing 100. In addition, it will be noted that the movement of the piston 53 toward the left in Figure 9 results in the forcing of the air through both of the passages 78 and 79. Eventually, this piston 53 covers port 78 and finally completely forces the remainder of the air out through port 79 and port 102. This double port action very effectually cushions the piston head and prevents hammering of this head against the cylinder head. The air which is thus forced out of port 78 passes through the relatively large-apertured bushing 97 in passage 96 and the air which is then forced out of port 79 passes through passage 102 immediately adjacent ball valve 88 and thence into passage 103 which also receives the exhaust air passing from passage 78 through bushing 97. It will be noted that the passage 102 is a very restricted area with the result that the air confined in between the piston surface 75 and the cylinder head after the port 78 has been closed by such piston is permitted to exhaust with relative slowness. This ensures a sufficient air cushion to absolutely preclude any undesirable hammering action. The exhaust air thus delivered to passage 103 then passes along channel 87 and up between the guides in valve 81 through channels 104 and 105 which lead to the atmosphere.

The shear lubricating device (shown best in Figures 17, 18 and 19) comprises a means for both cooling and lubricating the shears. It desirably comprises two pairs of nozzles 106 and 107 which are detachably mounted upon the enlarged ends 108 and 109 of conduits 110 and 111 which in the form shown constitute integral parts of the inner surfaces of the shear arms and which lead from central controlling ports in the shear post structure 63. Referring particularly to Figure 19, air with oil in suspension therein is introduced by means of a flexible pipe into tube 112 from which it passes through ports 113 and then upwardly through passage 114 and passage 115 to ducts 116 and 117. These ducts 116 and 117 lead directly into the conduits 110 and 111 but only when the shear arms are spread wide apart to the position shown in Figure 17. At this time, the air carrying the oil blows directly onto the shear blades. However, the shear post 63 with the ducts 115, 116 and 117 therein is precluded from rotation by means of the pin 119 so that the register of the ducts 116 and 117 with the conduits 111 and 110 only takes place at the time when the shear arms are spread wide apart. By reference to Figure 18, it will be noted that the cooling and lubricating fluid, due to the multiple nozzle structure and the angles at which they point, is thrown both upon the upper and lower sides of the blades so as to effect a quick and uniform cooling and lubricating action. More particularly, the angle of the fluid nozzles 106 and 107, as shown in Figure 17, is such as to direct the fluid not only on both sides of the blades but to more particularly direct it along and closely adjacent to the actual cutting edges. It is not only that the air cools the blades while the oil lubricates them, because there is an additional action wherein both the air and oil supplement each other. The point is that the air and oil combine to effectually remove the heat from the shear blades, and particularly from those portions of the blades which are in the glass first on the cutting action and which are last withdrawn upon the opening of the shear blades. Furthermore, the arms 61 and 62 which carry the shear blades are desirably made of bronze for the reason that this material serves to extract the heat from the blades to a maximum degree.

The shear blades (which are best shown in Figures 20, 21, 22 and 23) are a highly novel form. They are designated 120 and 121 and are provided with V-shaped cutting edges 122. The cutting edges of these blades are designed to move into overlapping relation and the contacting surfaces of these blades are both of very flat conical form. Thus the blade 120 shown in Figures 20, 21, 22, 23 and 25 is provided on its under surface as at 123 with a long flat curved contour while the blade 121 (Figure 25) is provided on its upper surface with an identical contour. The result is that when these blades come together and throughout their cutting action they always maintain a double point contact while the surfaces outside of these points of contact are forced more and more away from each other. Thus, at all times there is a positive shearing action by cutting edges which grip and enclose the column of glass and which gradually draw these points of contact together to completely sever the glass. The blades are provided on their upper and lower faces respectively with bevel surfaces as at 124.

Furthermore, these blades are provided at the outermost points thereof with ground-off portions 125 and 126 as shown in Figures 20 and 21 so that the initial bringing of these blades together will assure a proper assumption of their cutting relation.

A tension device thereon co-operates with the shear post structure to firmly hold the shear arms in position thereon. It comprises a collar 127 having a base flange 128 and having diametrically opposed openings of circular form 129 for the insertion of key 133. The lower edges of these openings 129 are cut away as at 130 for the purpose of forming bearings for the trunnions of the key 133. The collar is separated from the upper shear arm by a washer of hardened ground steel and the shear arms are separated from each other and from the post-supporting member by similar steel washers. These washers may be designated 131. Registering with the openings in the collar we have provided a keyway extending diametrically through the shear post at right angles to the center line of the shear as at 132. Extending transversely through the keyway 132 is a key 133 having trunnions 134 which rest in the cut-out portion 130 of the collar member. The opening provided through this collar and through the shear post afford room for vertical movement of the key. The key is forced downwardly by means of a coil spring 135 bearing upon the upper surface thereof and held in position to exert pressure upon such key by means of a cap 136 threaded into a socket in the upper end of the shear post. In structure, the key is provided with flat vertical surfaces on either side and with rounded upper and lower surfaces. It is important to note that the key is disposed at right angles to the center line of the axis of the shears with the result that any tendency toward separation of the shear blades is effectually overcome.

The oil carried in the air passing through and into the various ducts of the pivot post works its way over the surfaces with which the various washers contact and these washers are perforated at intervals to ensure a uniform distribution of this lubricant to all of the moving parts. Furthermore, the pivot post is provided with opposed vertical grooves 137 to further ensure this proper distribution of the lubricant.

The guide members take the form of depending arcuate plates 138 and 139 which plates are respectively carried by the shear arms 62 and 61. These arcuate plates are designed to surround the charge of glass at the instant of cutting and thereby to ensure either by contact with the glass or by juxtaposition to the glass that every charge cut will drop vertically and strike upon its lower end in the mold in order to facilitate and tend to ensure that the charges will settle vertically and distend laterally in the molds. Each pair of guides is so constructed that it will have a definite and predetermined angle of inclination from the vertical and that under normal operation of the shears the distance between the center points of the interiors of such guides will be predetermined. Therefore, each pair of guides is provided with calibrations which indicate the angle of inclination and the proper and normal distance between these center points of their interiors. The guides are selected for use, with relation to the distance between the center points of their interiors and with particular reference to the size of bushing through which the glass is being delivered. Although these guides will operate with different size delivery orifices, the desired and preferable use of them contemplates one pair of guides of a definite size for each delivery orifice of a definite size.

The angle of inclination of these guides 138 and 139 is also of vital importance. The cutting of the charge inevitably results in a tendency toward "batting" of the upper end of the charge, this being particularly true in the formation and production of relatively short charges. This tendency toward "batting" is somewhat neutralized by the tilting of the shears as previously described but the ill effect of this action is completely obviated by the depending guides. These guides may take many different forms. Their essential characteristic is that at the instant of cutting they ensure that the charge will be centered and will be dropped vertically so as to strike upon its lowermost end. One guide may be longer than the other. One may be at a different angle from the other. One may be vertical. In other words, they may vary as to angle, shape or length or as to all three of these, depending upon the conditions of operation. Thus, the guides having one angle of inclination may be suitable to a given size of delivery orifice and a given length of charge but may not be suitable if either the size of the delivery orifice or the length of the charge is varied. The guides are marked to indicate their various structural characteristics, for instance, the angle at which they will depend from the shears, the extent to which they will approach each other, et cetera. These guides 138 and 139 are so mounted on the shear arms by means of the bolts 140 and 141 and by means of the threaded bosses 142 and 143 extending into sockets in the base of grooves in the shear arms that they may be readily removed without interference with the shear blades or without removal of such shear blades. The opposing surfaces of the shear arms on either side of the grooves into which extend the threaded bosses 142 and 143 are machined to arcuate form as at 144 to coact with similar machined surfaces 145 on the exteriors of the guide members above and below the sockets 142 and 143 so that when these guides are placed in position and drawn into rigid relation with the shear arms by means of the bolts 140 and 141 in the threaded bosses 142 and 143 the said guides will always assume the same position upon the shear arms. It is also important to note that the same result accomplished by the interchange of the guides may likewise be accomplished by the adjustment of the sleeve member 66 by rotating the nut 72 which not only serves to vary the degree of overlapping of the shear blades but also serves to vary the degree to which the guide members approach each other.

We have also provided an extremely desirable form of pivot post for connecting the links 57 and 58 to the cross-head 56 and to the portions 59 and 60 of the shear arms. This form of pivot post is shown in Figures 29, 30, 31 and 32. By inspection of these figures it will be apparent that the pivot post 160 is provided on its upper portion with an oil chamber 161 and that it has radially arranged ports 162 through which the oil is fed to the connecting parts. The upper end of the post is preferably provided with a diametrically opposed slot 163 to facilitate holding of the same during application or removal. The lower end of the post is provided with an expansion screw structure in the form of a split collar 164 which is internally threaded for the reception of a spreading bolt 165.

From the description thus far given of the various adjustments provided, it will be apparent that the shears may be moved longitudinally of the spout structure in order to compensate for contractions and expansions due to variations in temperature and possibly to compensate for variations initially occurring in the setting up of the apparatus. Furthermore, it will be obvious that the shears may be raised or lowered to bring them into any desired distance from the glass delivery orifice. Also, the shears may be adjusted transversely of themselves so as to facilitate centering of the charges being severed with relation to the molds into which they are being dropped. Also, it is evident that the degree of overlapping of the shears and the consequent relative position of the guides may be varied at will.

A further important feature of our invention has to do with the provision of the mechanism by which the shear structure may be partially rotated to bring about a tilting of the shear blades. The primary purpose of this is to make both sides of this freshly cut end as near one plane as possible. A doubly beneficial action results from this because the freshly cut end of the column is not only rendered substantially straight but the tendency toward "batting" of the upper ends of the short charges is practically neutralized. This type of cutting action is particularly important in our apparatus for the reason that immediately after cutting we support the glass by fluid pressure. Under these conditions, any material irregularity of the freshly cut end such as must occur from cutting with lever shears will result in the distortion of succeeding charges. Whenever this uneven surface is left on the lower end of the glass from which the charge has been cut, the application of fluid pressure thereto will result in the blowing back or supporting of one side of the column more effectively than the other side with the result that the succeeding charge becomes distorted. In other words, if the freshly cut end of the glass presents a lower surface in two planes, it will be extremely difficult to balance the glass due to the fact that more pressure is necessary to balance one side of the column than the other side and when this occurs the succeeding charge will be distorted.

An important characteristic of our invention arises from the fact that the movement of the shear blades both into and out of cutting relation is regulable independently of the rate of production of the charges. As stated above, the introduction of air intermittently to cause successive operations of the shears is under the control of an automatic timer. This timer may be driven at different speeds and may be adjusted so that feeding device will deliver charges at varying rates. Thus, we may deliver twenty charges per minute or we may deliver more or less. However, our shear structure and the operating mechanism therefor is such that the speed of movement of the shears either into or out of cutting relation or both may be varied or maintained independently of the maintenance or the variation of the rate of production of the charges. This is highly important since in all existing machines with which we are familiar any variation of the rate of production of the charges necessarily results in a variation of the speed of delivery movement. The primary reason that we are able to have this highly desirable result is that each operation of the shears from open position to closed position and back to open position again is initiated merely by the introduction of an impulse of air under pressure and is completed by the automatic operation of the shear-actuating mechanism which has been described.

The many other features of our invention have been more fully set forth above. There are many advantages that arise from the structure outlined and some of these advantages have already been set forth.

Having thus described our invention, what we claim is:

1. A shear structure for severing molten glass comprising a pair of shears movable into overlapping relation when the shears are closed, means for opening and closing the shears, and means for varying the degree of overlap of said shears while in operation, said means being adapted to mechanically insure the same degree of adjustment of each blade.

2. A shear structure for a glass feeder comprising a pair of cooperating shear blades, and means for tiltably adjusting said structure to depress one shear blade and to elevate the other blade accordingly.

3. A shear structure for a glass feeder comprising a pair of shears, means for tilting said shears, and means for adjusting said shears vertically and horizontally in any direction.

4. A shear structure for a glass feeder comprising a pair of shears, means for tilting said shears, and means for adjusting said shears vertically and horizontally in either direction, said last means being of such a nature that proper adjustment may be attained regardless of the degree to which the shears have been tilted.

5. A shear structure for a glass feeder comprising a pair of shears, and means for tilting said shears, said means being of such a construction that the relation of the center of the shears to the bottom of the delivery orifice of the feeder will be the same regardless of the degree of tilt.

6. A shear structure for a glass feeder comprising a pair of shears, a means for adjusting said shears vertically, means for tilting said shears, and a specially rounded surface to ensure uniform adjustment for uniform vertical relation to the delivery orifice of the feeder regardless of the tilt of the shears.

7. A shear structure for a glass feeder comprising a pair of shears, means for adjusting said shears vertically and horizontally in any direction, means for tilting said shears, and a specially rounded surface coacting with the means for adjustment vertically and horizontally to ensure uniform adjustment regardless of the tilt of the shears.

8. A shear structure for a glass feeder comprising a pair of shears, a universal support for the entire structure, a laterally extending member, and means for adjusting said member to rotate the shear structure and thus tilt the shears to any desired position.

9. A shear structure for a glass feeder comprising a pair of shears, a universal support for the entire shear structure, a laterally extending member, adjusting hand wheels on either side of said member for the rotation of the shear structure to any desired position of tilt and for retention in such position, and a spanner sleeve embraced by said member to avoid binding of the hand wheels thereon.

10. A shear structure for a glass feeder comprising a pair of shears, a rear cylindrical shank member, a split sleeve, means for clamping said sleeve to said shank member to hold it in any adjusted position, and means for adjusting said shank member after releasing said last-named member.

11. A shear structure for a glass feeder comprising a laterally extending member, and hand wheels above and below said member for adjusting said member to tilt the shears, said member being rounded at the points of contact with the said hand wheels.

12. A shear structure for severing molten glass comprising a pair of shears movable into overlapping relation when the shears are closed, means for opening and closing the shears, and means for simultaneously adjusting the shears to vary their degree of overlap while in operation.

13. A shear structure for a glass feeder comprising a pair of shears, a shear post for supporting the shears, a fluid pressure cylinder for actuating the shears, and means for adjusting the shear post relative to the cylinder to vary the overlap of said shears.

14. A shear structure for a glass feeder comprising a pair of shear arms, shear blades carried by said shear arms, arcuate guide members supported on and depending from said shear arms below said shear blades, and means for varying the degree of overlap of said shears and the distance between said arcuate guide members.

15. A shear structure for a glass feeder comprising a universal support for the rear of said structure, means for adjustably supporting the front end of said shear structure from beneath, and a resilient means for resisting the upward movement of the front end of said shear structure by said adjusting means.

16. A shear structure for a glass feeder comprising a universal support for the rear of said shear structure, a means for laterally adjusting the forward end of said shear structure, said last means comprising an adjusting screw on one side of said shear structure and a resilient resisting element on the other side of said shear structure.

17. A shear structure for a glass feeder comprising a universal support for the rear end of said shear structure, and a yoke support for the front end of said shear structure, one leg of said yoke being movable to permit removal of said shear structure.

18. A shear structure for a glass feeder comprising a universal support for the rear end of said shear structure, a yoke member for the support of said shear structure at its forward end, one leg of said yoke member being capable of movement into horizontal position, and means for locking said leg in vertical position.

19. A shear structure for a glass feeder comprising a pair of shears and means for adjusting said shears vertically, horizontally in any direction and tiltably, said last means being operable while the shears are in operation.

20. In shear structure for glass feeders, a shear actuating mechanism comprising a cylinder, a piston of differential area construction, means for holding the shears open by the continuous application of air pressure to the smaller area of said piston, means for closing said shears by the intermittent application of air pressure to the greater area of said piston, and a differential area valve for controlling the exhaust or admission of air to said large area of said piston.

21. In shear structure for glass feeders, shears, shear actuating mechanism comprising a cylinder, a piston operated in said cylinder to open and close said shears, and means for choking the flow of air from either end of said cylinder to cushion the piston at either end of its movement, said means being variable by substitution to vary the rapidity of flow, whereby the speed of opening and closing of the shears may be varied.

22. In a shear structure for glass feeders, a shear actuating mechanism comprising a cylinder, a piston designed to both open and close the shears under air pressure, and means ensuring a more rapid exhaust of air from the rear of the piston during the opening action than from the front of the piston during the cutting action of the shears, whereby the speed of opening of the shear blades is more rapid than the closing of said shears.

23. In shear structure for glass feeders, a shear lubricating device comprising means for delivering oil laden air to the shears.

24. In shear structure for glass feeders, a shear lubricating device comprising a plurality of nozzles, for delivering a lubricating fluid to the shear blades, said nozzles being so directed as to throw streams of this fluid along the cutting edges of said shear blades upon the upper and lower sides thereof.

25. In combination with a shear structure for glass feeders, a shear cooling device and means for directing streams of oil-laden air upon the shear blades.

26. In combination with a shear structure for glass feeders, a cooling device controlled by the movement of the shears for intermittently directing a cooling medium to the shear blades.

27. The method of lubricating shear blades for severing molten glass which comprises delivering streams of oil-laden air onto said blades.

28. In shear structure for glass feeders, means for delivering oil-laden air to the shear blades, said means being inoperative during the cutting action and being automatically operated upon opening of the shears.

29. In shear structure for glass feeders, nozzles for directing a cooling medium to the shear blades, and a controlling valve structure contained in the shear post of such a nature that the fluid is automatically cut off during the cutting action of the shears and automatically delivered each time the shears return to open position.

30. In shear structure for glass feeders, a pair of substantially inflexible shear blades each having re-entrant cutting edges, the said blades being so formed as to insure only two points of contact between the said blades throughout the cutting action and so that the surfaces of the blades at the outer sides of these points of contact are moved apart as the blades close, and a tensioning device for holding the blades in cooperative relation, to insure the said two-point contact between the said blades during the cutting operation.

31. In shear structure for glass feeders, shear arms, a shear post upon which said arms are pivotally mounted, an air-controlling valve in the shear post through which oil is passed to the shear blades, and means for diverting some of said oil to lubricate the shear post and adjacent parts.

32. Shear structure for glass feeders comprising shear arms, shear blades carried by said arms, and arcuate guide members depending from said shear arms beneath said shear blades.

33. Shear structure for glass feeders comprising shear arms, shear blades, and cooperating guide members depending from said shear arms, said guide members approximating the shape of the glass to be severed, said guide members being disposed at an angle from the vertical and being positioned on said arms to guide the severed charges as they drop away from the feeder.

34. Shear structure for glass feeders comprising shear arms, shear blades, and guiding means depending from each of said shear arms, said guide means being interchangeable and replaceable.

35. Shear structure for glass feeders comprising shear arms, shear blades, removable arcuate guide members depending from said shear arms and beneath said shear blades, said guide members being adapted to partially enclose a mold charge while being severed, and means for detaching and substituting guides to vary the size of the enclosure formed by said guides.

36. Shear structure for glass feeders comprising shear arms, shear blades, guide members depending from said arms beneath said blades, and means for varying both the degree of overlap of said shear blades and the degree to which said guide members approach each other.

37. A shear structure for a glass feeder comprising a pair of pivotally mounted overlapping shear blades, means for opening and closing the shear blades, and means for adjusting said shears simultaneously around their pivotal axis to vary the degree of overlap.

38. A shear structure for a glass feeder including a pair of pivoted shear blades, means for periodically opening and closing the shear blades, and means for simultaneously adjusting the shear blades to vary the degree of overlap of the shear blades, said means being in addition to the mechanism for effecting the periodic opening and closing of the shears.

39. In a shear structure for a glass feeder, comprising a cylinder, a sleeve disposed adjacent said cylinder, shear arms mounted upon a pivot carried by said sleeve, and means for adjusting said sleeve longitudinally relative to said cylinder to vary the overlap of said shears.

40. In a shear structure for a glass feeder, comprising a cylinder, a slidable member disposed adjacent said cylinder, a pair of shear arms mounted on said slidable member, shear blades carried by said arms, guide members supported by and depending from said arms, and means for adjusting the slidable member toward and from the cylinder to vary the degree of overlap of said shears and the distance between said guide members.

41. The method of lubricating shear blades for severing molten glass which comprises directing a cooling fluid along the upper and under surfaces of the said blades simultaneously, after each severing operation of the blades.

42. In shear structure for glass feeders, a pair of shear blades, a liquid distributing device including nozzles carried by each shear blade for intermittently directing a cooling medium to the blades and for predetermined intervals, said intervals being determined by the position of the blades with respect to each other.

43. In shear structure for glass feeders, comprising a post provided with ducts, arms carrying shear blades mounted thereon, conduits mounted adjacent said arms adapted to register with said ducts, and means for periodically connecting the ducts with the said conduits.

44. In shear structure for glass feeders, comprising a post provided with ducts, arms carrying shear blades or knives mounted thereon, conduits mounted adjacent said arms and carried thereby adapted to be moved into registry with the said ducts, and means for periodically moving the conduits into registry with the said ducts.

45. Shear structure for glass feeders, comprising two shear arms carrying shear blades, and guide members depending from said shear arms for substantially surrounding a suspended mold charge just prior to and at the time of its severance by said shear blades.

46. Apparatus for gathering glass comprising a receptacle for molten glass with a feed aperture in its base, knives horizontally disposed beneath such aperture, and means for adjusting such knives so that they are tilted from the horizontal.

47. Glass gathering apparatus comprising a receptacle for molten glass with a feed aperture therein, and knives below said feed aperture, said knives being vertically and tiltably adjustable.

48. Glass gathering apparatus comprising a pair of shears for cutting off lumps of glass from a molten mass, and means mounted on each shear for so directing the deposit of such lumps that the cut surface remains uppermost upon deposit.

49. Glass gathering apparatus comprising means for cutting off lumps of glass from a molten mass, and means for varying the angle of the cutting knives to direct the deposit.

50. Glass gathering apparatus comprising a pair of shears for cutting off lumps of glass from a molten mass, and encircling elements, one mounted on each shear, for preventing tilting of said lumps.

In testimony whereof we hereby affix our signatures.

OLIVER M. TUCKER.
WILLIAM A. REEVES.